United States Patent
Kusche et al.

(10) Patent No.: US 11,530,780 B2
(45) Date of Patent: Dec. 20, 2022

(54) METHOD FOR STORING HYDROGEN GAS, HYDROGENATION REACTOR AND TRANSPORT CONTAINER

(71) Applicant: HYDROGENIOUS TECHNOLOGIES GmbH, Erlangen (DE)

(72) Inventors: Matthias Kusche, Schwaig (DE); Berthold Melcher, Erlangen (DE); Cornelius Randig, Erlangen (DE); Federico Westerath, Altdorf (DE); Caspar Paetz, Erlangen (DE); Daniel Teichmann, Munich (DE)

(73) Assignee: HYDROGENIOUS LOHC TECHNOLOGIES GMBH, Erlangen (DE)

( * ) Notice: Subject to any disclaimer, the term of this patent is extended or adjusted under 35 U.S.C. 154(b) by 737 days.

(21) Appl. No.: 16/461,206

(22) PCT Filed: Oct. 24, 2017

(86) PCT No.: PCT/EP2017/077168
§ 371 (c)(1),
(2) Date: May 15, 2019

(87) PCT Pub. No.: WO2018/091238
PCT Pub. Date: May 24, 2018

(65) Prior Publication Data
US 2019/0309904 A1    Oct. 10, 2019

(30) Foreign Application Priority Data
Nov. 16, 2016 (DE) .................. 10 2016 222 597.9

(51) Int. Cl.
*F17C 11/00* (2006.01)
*B01D 53/02* (2006.01)
*C01B 3/00* (2006.01)

(52) U.S. Cl.
CPC ............ *F17C 11/005* (2013.01); *B01D 53/02* (2013.01); *C01B 3/0015* (2013.01); *Y02E 60/32* (2013.01)

(58) Field of Classification Search
None
See application file for complete search history.

(56) References Cited

U.S. PATENT DOCUMENTS

| | | | |
|---|---|---|---|
| 2,730,556 A | 1/1956 | Liedholm | |
| 4,507,274 A | 3/1985 | Broecker et al. | |
| 5,499,279 A * | 3/1996 | Chakraborty | G21C 19/317 423/580.1 |
| 6,802,875 B1 | 10/2004 | Kimbara et al. | |
| 2002/0025461 A1 * | 2/2002 | Shimada | H01M 8/065 429/423 |
| 2004/0244589 A1 * | 12/2004 | Bossard | B01D 71/022 95/55 |
| 2005/0229489 A1 * | 10/2005 | Bavarian | C01B 3/38 48/198.3 |
| 2017/0008762 A1 | 1/2017 | Arlt et al. | |
| 2017/0341936 A1 | 11/2017 | Wasserscheid et al. | |

FOREIGN PATENT DOCUMENTS

| | | |
|---|---|---|
| AU | 2015 100 655 A4 | 6/2015 |
| CN | 101437750 A | 5/2009 |
| CN | 103918118 A | 7/2014 |
| CN | 104801239 A | 7/2015 |
| CN | 105814241 A | 7/2016 |
| DE | 10 2014 006430 A1 | 11/2015 |
| EP | 1 475 349 A2 | 11/2004 |
| JP | 2002-134141 A | 5/2002 |
| JP | 3812880 B2 | 8/2006 |
| WO | 2014/044706 A1 | 3/2014 |
| WO | 2015/110334 A1 | 7/2015 |
| WO | 2016/078948 A1 | 5/2016 |
| WO | 2016/078949 A1 | 5/2016 |

* cited by examiner

*Primary Examiner* — Sheng H Davis
(74) *Attorney, Agent, or Firm* — McGlew and Tuttle, P.C.

(57) ABSTRACT

A method for storing hydrogen gas includes the process steps pre-heating of an at least partially dehydrogenated hydrogen carrier material, storing the hydrogen gas in chemically bound form on the hydrogen carrier material as well as cooling and conditioning of the at least partially hydrogenated hydrogen carrier material.

13 Claims, 2 Drawing Sheets

METHOD FOR STORING HYDROGEN GAS, HYDROGENATION REACTOR AND TRANSPORT CONTAINER

CROSS REFERENCE TO RELATED APPLICATIONS

This application is a United States National Phase Application of International Application PCT/EP2017/077168 filed Oct. 24, 2017, and claims the benefit of priority under 35 U.S.C. § 119 of German Patent Application, Serial No. DE 10 2016 222 597.9, filed on Nov. 16, 2016, the entire contents of which are incorporated herein by reference.

TECHNICAL FIELD

The invention relates to a method for storing hydrogen gas, a hydrogenation reactor as well as a transport container.

TECHNICAL BACKGROUND

From EP 1 475 349 A2, a method for storing and releasing hydrogen gas on a hydrogen carrier material is known.

SUMMARY

It is an object of the invention to improve the storage of hydrogen gas in chemically bound form on the hydrogen carrier material in a way that hydrogen gas can be reliably stored by means of a method that is robust and feasible with regard to economic points of view.

This object is achieved by a method for storing hydrogen gas comprising the process steps pre-heating of an at least partially dehydrogenated hydrogen carrier material, storing the hydrogen gas in chemically bound form on the hydrogen carrier material, cooling and conditioning of the at least partially hydrogenated hydrogen carrier material, with a hydrogenation reactor comprising a reactor housing, at least one catalyst mount arranged in the reactor housing, wherein a catalyst carrier with catalyst material is arranged at said at least one catalyst mount, a cooling unit for cooling the at least one catalyst mount, a distribution unit for uniform distribution of an intake flow of at least partially dehydrogenated hydrogen carrier material and hydrogen gas to the at least one catalyst mount, an outlet opening for continuous discharge of at least partially hydrogenated hydrogen carrier material from the hydrogenation reactor and with a transport container in which a hydrogenation reactor is arranged. The core of the invention is to combine process steps in such an advantageous way that hydrogen gas can be stored reliably and economically. The storage of the hydrogen gas takes place in chemically bound form on a hydrogen carrier material by hydrogenating the hydrogen carrier material. The hydrogenation of the hydrogen carrier material is carried out in particular by means of a heterogeneous reaction control. Heterogeneous means that the reaction partners are present in different aggregate states. In particular, a catalyst with a catalyst material in solid state, i.e. a solid material, liquid hydrogen carrier material and hydrogen gas are used for charging the hydrogen material. It is also conceivable that two aggregate states, i.e. in particular solid and liquid, solid and gaseous or liquid and gaseous, configure the basis of the heterogeneous reaction control.

The hydrogenation of the hydrogen carrier material is reversible, with the result that the hydrogen gas can be released again later on by dehydrogenation of the hydrogen carrier material. The hydrogen carrier material, in particular, is an organic liquid, which is also known as liquid organic hydrogen carrier (LOHC), such as for example liquid hydrocarbon compounds. Corresponding hydrogen carrier materials are for example known from EP 1 475 349 A2, the entire contents of which are incorporated by reference.

According to the invention, it has been found that the pre-heating of the at least partially dehydrogenated hydrogen carrier material is energy-efficient for the entire process. Depending on the reaction conditions and the charging state of the hydrogen carrier material, a more or less complete hydrogenation of the hydrogen carrier material is possible. In particular, the supplied hydrogen carrier material is not entirely dehydrogenated. The supplied hydrogen carrier material may to a certain proportion already be charged with hydrogen. It is essential that the supplied hydrogen carrier material has sufficient charging capacity in order to absorb hydrogen gas and store it, i.e. to be charged with it. It is advantageous if the supplied hydrogen carrier material has a charging degree of at most 50%, in particular of at most 40% and in particular of at most 30%. After the storage of the hydrogen gas, i.e. after the hydrogenation of the hydrogen carrier material, the charging degree of same is higher than before, in particular higher than 70%. It is especially preferred if the supplied hydrogen carrier material has a charging degree of less than 20%, wherein the charging degree after the hydrogenation of the hydrogen carrier material is higher than 95%.

The storage of the hydrogen gas, i.e. the hydrogenation of the hydrogen carrier material, takes place in particular in a hydrogenation reactor. Due to the cooling and conditioning of the at least partially hydrogenated hydrogen carrier material, reliable and riskless handling and storage are ensured. The method according to the invention is in particular also economically feasible with small facilities. Such small facilities can be run in a decentralized manner. A small facility is in particular transportable, i.e. in particular transportable within a transport container. A small facility, in particular, has a power of up to 5 MW. Supply and removal of hydrogen carrier material are carried out by truck transport. The supply and removal of hydrogen carrier material is flexibly possible as to time and place. Inert and rigid transport systems such as shipping, trains and/or pipelines may be dispensed with.

The method can in particular be carried out with the hydrogenation reactor that may be accommodated in a transport container that is known as such. By means of the transport container, the hydrogenation reactor can be applied location-independently. By means of the transport container, the dehydrogenation reactor can be transported to a decentralized application site and be run there, flexibly and without complications.

A pre-heating of the at least partially dehydrogenated hydrogen carrier material that comprises a contacting with the at least partially hydrogenated hydrogen carrier material allows for efficient and direct supply of heat in an advantageous manner. It is energy-efficient when the educt, that is at least partially dehydrogenated hydrogen carrier material, is pre-heated by the product of the hydrogenation, i.e. the at least partially hydrogenated hydrogen carrier material. The heat that is latently present in the product is directly used for the pre-heating of the educt. The heat transfer between the educt and the product can take place by a direct or indirect contacting of the hydrogen carrier materials. A direct or indirect contacting of the at least partially dehydrogenated hydrogen carrier material with the at least partially hydrogenated hydrogen carrier material additionally allows for a cooling of the product and/or a conditioning of the product.

Due to the direct contacting, impurities can be directly separated from the at least partially hydrogenated hydrogen carrier material. A detached separation of impurities is thus facilitated and in particular dispensable.

The storage of the hydrogen gas, i.e. the hydrogenation of the hydrogen carrier material in the form of LOHC, which takes place at a process pressure between 30 bar and 60 bar, in particular between 40 bar and 50 bar, in particular about 45 bar, and/or at a process temperature between 200° C. and 350° C., in particular between 230° C. and 330° C., in particular between 250° C. and 310° C., is possible in an especially advantageous way. The reaction conditions favor an efficient hydrogenation. The hydrogen gas is bound to the hydrogen carrier material in chemically bound form. An incorporation of hydrogen gas as a pure substance is dispensable. For the hydrogenation of the hydrogen carrier material, catalysts can be used which may have platinum, palladium, ruthenium, nickel, and/or rhodium as catalyst material and which are applied on an inert catalyst carrier. As an inert material for the catalyst carrier, aluminum oxide, silicon oxide and/or silicon carbide may be used.

A conditioning of the hydrogen gas that comprises in particular a pre-heating of the hydrogen gas and/or a separation of at least one impurity, wherein the at least one impurity, is present in solid and/or gaseous aggregate state, ensures a reliable execution of the method. Due to the conditioning of the hydrogen gas, the method is flexibly applicable, in particular independently from a hydrogen source, from which hydrogen is provided. It is known that hydrogen gas, depending on its origin, i.e. depending on the hydrogen source, may show different impurities, which may necessitate different purification steps, respectively. Due to the purification of the hydrogen gas, the storage, stocking, handling and security of the method can be ensured. The conditioning takes place, in particular, before the storage of the hydrogen gas. The conditioning comprises, in particular, the separation of at least one impurity of the hydrogen gas to be stored. Hydrogen gas that is provided from random hydrogen sources is not sufficiently purified for the commercial use in the LOHC technology, i.e. for the hydrogenation of LOHC. Depending on the hydrogen gas source, different separation stages may be provided in order to separate impurities in solid and/or gaseous aggregate state. In addition or alternatively to the separation, a pre-heating of the hydrogen gas may be provided. Typically, the pre-heating of the hydrogen serves for increasing the degree of efficiency of the hydrogenation reaction.

A separation method in which the separation comprises at least one separation stage, in particular several separation stages, wherein in particular the at least one separation stage serves for separating an impurity of a specific aggregate state, allows for detached separation stages, in particular depending on the impurities, in particular depending on the aggregate state of the impurities, in the hydrogen gas to be stored. For the separation of solid parts, in particular of coke particles from biomass gassing, a solid material separation operation is applied.

A method in which the separation shows a catalytic conversion and/or an adsorptive drying allows for the separation of vaporous impurities such as volatile amines, halogen compounds, carbon monoxide, water vapor and/or molecular oxygen. Volatile amines and halogen compounds in the hydrogen gas can find their way into the hydrogen gas due to the production process, for example the chlor-alkali hydrolysis, or due to a preceding purification stage, in particular amine washing. A catalytic conversion of the hydrogen gas with traces of molecular oxygen into water, and the removal thereof by means of adsorptive drying, is particularly advantageous for the separation of the vaporous impurities.

A desulfurization comprised in the separation is advantageous. Sulfur compounds can be separated out of the hydrogen gas. In particular, the hydrogen gas is sulfur-free, the sulfur content is in particular lower than 1 ppm.

A method in which the conditioning takes place until a, in particular variably, adjustable degree of purity of the hydrogen gas is achieved, ensures sufficient purification of the hydrogen gas, which is required for the further processing thereof, in particular the hydrogenation of the hydrogen carrier material.

A cooling of the at least partially hydrogenated hydrogen carrier material that takes place by means of an additional cooling unit ensures sufficient heat removal of the at least partially hydrogenated hydrogen carrier material. In particular, if the heat of the product flow cannot be removed in sufficient quantity, for example by contacting the educt flow, an additional cooling unit ensures the aspired cooling to a temperature range of under 60° C., in particular of under 50° C. and in particular to under 40° C. The at least partially hydrogenated hydrogen carrier medium that is cooled down this way allows for secure handling and stocking thereof, in particular over a longer period of time.

A conditioning of the at least partially hydrogenated hydrogen carrier material that comprises a removal of physically dissolved hydrogen gas in the hydrogen carrier material increases the safety in stocking and handling the at least partially hydrogenated hydrogen carrier medium. The conditioning comprises the removal of physically dissolved hydrogen gas in the hydrogen carrier material. By this means, it can be avoided that the at least partially hydrogenated hydrogen carrier material leads to degassing of not chemically bound hydrogen gas upon longer storage in a storage container. Hydrogen gas that is released this way might accumulate in the storage container above the liquid phase of the hydrogen carrier material and in particular give rise to an explosive hydrogen atmosphere. Due to the reaction conditions upon hydrogenation, in particular the process pressure of up to 60 bar and a sufficiently long dwell time at high dynamic mixing, an entire saturation of the liquid hydrogen carrier material with hydrogen gas of corresponding thermo-dynamic balance can be assumed. The separation of the physically dissolved hydrogen gas from the at least partially hydrogenated hydrogen carrier material may take place in one stage or in several stages. For example, the separation may take place in a vacuum degassing unit. Basically, separation methods that are used for degassing water or hydrocarbon are also possible, whereas the hydrogen carrier material has a higher viscosity in comparison with the compounds mentioned before. In particular, in a first separation stage, a distribution unit, in particular in the form of a shower head, may be applied in order to distribute the LOHC material with comparably high viscosity and afterwards guide same to a stripping column and/or a spray tower. An acceleration of the process is possible by reducing the partial pressure of the hydrogen gas. This is possible, for example, by creating a vacuum and/or by using a flushing gas. When using a flushing gas, the hydrogen gas can be removed in one column. As flushing gas, natural gasses such as nitrogen or argon, but also compressed air, may be applied. In particular, it is possible to monitor and to adjust the process temperature and the flushing gas flows, i.e. the volume per time unit of the flushing gas, in order to specifically set up a maximum admissible residual concentration of hydrogen gas in the at least partially hydrogenated hydrogen carrier material by this means. This maximum admissible residual concentration of physically dissolved hydrogen gas is defined such that in a small volume of an entirely filled tank, upon assumed storage up to an arising thermo-dynamic balance, a sufficiently high hydrogen concentration is avoided in order to reach a lower explosion limit of hydrogen gas in air or air with minimum portions of hydrogen carrier medium, in particular LOHC. It is advantageous if the hydrogen content remaining in the hydrogen carrier material is between 0.1 and 10 ppm by weight.

A hydrogenation reactor that comprises a reactor housing, at least one catalyst mount arranged in the reactor housing, wherein a catalyst carrier with catalyst material is arranged at said at least one catalyst mount, a cooling unit for cooling the at least one catalyst mount, a distribution unit for uniform distribution of an intake flow of at least partially dehydrogenated hydrogen carrier material and hydrogen gas to the at least one catalyst mount, an outlet opening for continuous discharge of at least partially hydrogenated hydrogen carrier material from the hydrogenation reactor, ensures an advantageous execution of the hydrogenation of the hydrogen carrier material, i.e. the storage of the hydrogen gas in chemically bound form on the hydrogen carrier material. The advantages of the hydrogenation reactor basically correspond to those of the method, reference to which is made herewith. It has been found that the catalyst material necessary for the hydrogenation is advantageously arranged in the reactor housing with at least one catalyst mount and that it is advantageously accessible from outside the reactor for possibly required maintenance and/or repairs. The catalyst mount may show an advantageous geometry. At least one compensating unit inside the reactor housing is particularly advantageous. The at least one compensating unit allows for a uniform distribution of the hydrogen gas to be stored in the reactor housing to the hydrogen carrier material. In particular, the distribution may take place also depending on the reaction time, i.e. along the axis of increasing reaction progress, in such a uniform way that a pressure loss in the reactor housing is as low as possible. The compensating unit may, for example, be configured as a tube body, whereas the tube body is in particular configured free from catalyst material. In the tube body, the supplied hydrogen gas can spread uniformly in order to be led to the catalyst filling. The tube in particular shows an annular cross section.

It has been found that the hydrogenation reactor, which is configured without movable parts, is mechanically especially robust and particularly advantageous for permanent operation. Wearing of reactor components is essentially excluded. Stirrers and/or pumps can be understood as additional movable units. The cooling of the at least one catalyst mount by means of a cooling unit is particularly advantageous. By this means, the heat from the reaction enthalpy can be removed especially efficiently. An overheating of the catalyst material and/or the catalyst carrier in the catalyst mount is excluded. Downtimes of the hydrogenation reactor are minimized. The total degree of efficiency, i.e. the total operating time in relation to the total service life of the hydrogenation reactor, upon the execution of the method is increased. Due to the fact that the resulting hydrogenation heat can be reliably removed from the hydrogenation reactor, temperature concentrations, so-called hot spots, can be avoided. The operational safety of the hydrogenation reactor and/or the robustness of the hydrogenation process are increased. The hydrogenation reactor has a distribution unit, which is arranged in particular within an inflow zone. The distribution unit ensures the distribution of the supply flow of the at least partially dehydrogenated hydrogen carrier material. The hydrogenation reactor has an outlet opening, which is arranged in particular in the area of an outflow zone. Via the outlet opening, the at least partially hydrogenated hydrogen carrier medium can be discharged, without or with preferably low pressure loss, from the hydrogenation reactor and conducted towards a storage container. The execution of the method in which the hydrogenation reactor is emptied exclusively via the hydrogen pressure is especially advantageous. By this means, the use of movable parts and/or additional technical aggregates for emptying the reactor are dispensable.

A catalyst material such as platinum, palladium, nickel, rhodium and/or ruthenium, each with a weight portion of 0.1% to 10% with reference to the, in particular inert, catalyst carrier, allows for advantageous hydrogenation of the hydrogen carrier material, in particular considering the strongly exothermic reaction conditions. The hydrogenation of the hydrogen carrier material is ensured, even with a temporary overheating in the hydrogenation reactor.

A catalyst carrier that comprises aluminum oxide, silicon oxide, silicon carbide and/or activated carbon ensures an advantageous provision of catalyst material, which is in particular heat-resistant. An excessive increase of the reaction temperature in the hydrogenation reactor due to the strongly exothermic course of the procedure is unproblematic in view of the catalyst carrier.

A cooling unit that has a sleeve filled with liquid, vapor and/or gas ensures sufficient cooling of the at least one catalyst mount in order to prevent excessive overheating of the catalyst mount and in particular of the catalyst carrier and/or catalyst material arranged in the catalyst mount. The danger of an undesired overheating of the catalyst mount as a result of the strongly exothermic reaction conditions is reliably prevented.

A transport container in which a hydrogenation reactor is arranged, which comprises a reactor housing, at least one catalyst mount arranged in the reactor housing, wherein a catalyst carrier with catalyst material is arranged at said at least one catalyst mount, a cooling unit for cooling the at least one catalyst mount, a distribution unit for uniform distribution of an intake flow of at least partially dehydrogenated hydrogen carrier material and hydrogen gas to the at least one catalyst mount, an outlet opening for continuous discharge of at least partially hydrogenated hydrogen carrier material from the hydrogenation reactor, allows for the flexible, location-independent and decentralized application of the method for the storing of hydrogen. The method can be applied without complications and need-based. The components necessary for the execution of the method may be arranged additionally in the transport container. For example, additional components for the execution of the method according to the invention, i.e. a pre-heating unit for pre-heating the at least partially dehydrogenated hydrogen carrier material, a conditioning unit for conditioning the hydrogen gas and/or a cooling and conditioning unit for cooling and/or conditioning the at least partially hydrogenated hydrogen carrier material, are arranged in the transport container. It is possible to provide further components such as storage containers for educt and/or product as well as for auxiliary materials such as contained in natural gas, cooling water and/or heat transport medium. The storage containers for auxiliary materials may also be arranged outside the transport container.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
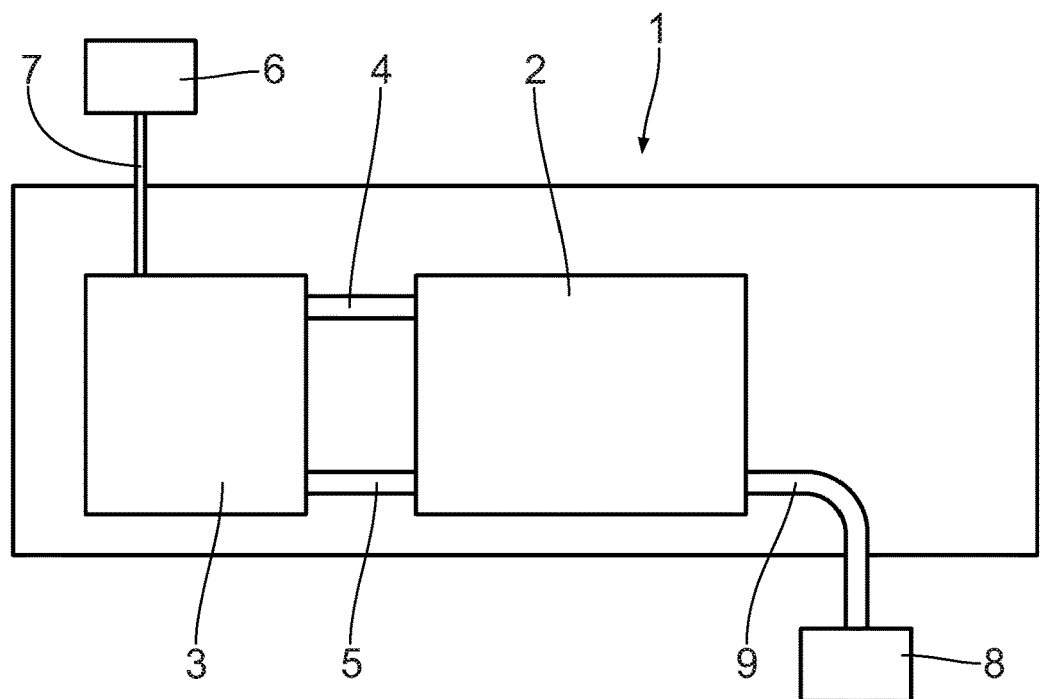
FIG. 1 is a schematic side view of a transport container with a hydrogenation reactor according to the invention.

A transport container 1 shown in FIG. 1 is known as such and can be transported without complications with a ship, a truck and/or a railroad car. The transport container 1 has standardized dimensions.

In the transport container 1, a hydrogenation reactor 2 is arranged, which is connected with an LOHC storage container 3 by means of an LOHC supply line 4 and an LOHC output line 5. LOHC serves as a hydrogen carrier medium. It is also conceivable to provide two separate LOHC storage containers, whereas a first LOHC storage container is connected with the hydrogenation reactor 2 via a the LOHC supply line 4 and a second LOHC storage container is connected with the hydrogenation reactor 2 via the LOHC output line 5. By this means, the separate stocking of LOHC in an at least partially hydrogenated or partially dehydrogenated state is possible.

The LOHC storage container 3 is connected by means of an LOHC source 6 via a line 7. The LOHC source 6 can be an external source, as for example an LOHC transport vehicle. The external source can also be an external LOHC supply grid, to which the transport container 1 can be connected.

In addition or alternatively, the LOHC source 6 can show a dehydrogenation reactor or be connected therewith, whereas the dehydrogenation reactor serves for discharging, i.e. at least partially dehydrogenating, LOHC. For this purpose, at least partially charged LOHC is discharged in the dehydrogenation reactor, which is not shown, i.e. hydrogen is released. The released hydrogen gas may, for example, serve for the conversion into electricity in a fuel cell. The electric power can be used, i.e. consumed, on site, at least partially be used for operating the transport container 1 and the components comprised therein and/or be fed back to a, in particular, public power supply.

The LOHC source 6 is, in particular, arranged outside the transport container 1. The line 7 can have a suitable interface in order to create an uncomplicated connectivity with the LOHC source. The LOHC source 6 is, in particular, arranged stationarily in a place of electricity use and/or electricity feed-in. It is possible to integrate the LOHC source 6 at least partially into the transport container 1, in particular in the form of the dehydrogenation reactor and/or the fuel cell.

The LOHC supply line 4 serves for supplying at least partially dehydrogenated LOHC from the LOHC storage container 3 into the hydrogenation reactor 2. The LOHC output line 5 serves for discharging at least partially hydrogenated LOHC from the hydrogenation reactor 2 into the LOHC storage container 3.

The hydrogenation reactor 2 is connected with a hydrogen source 8 via a hydrogen line 9. The hydrogen source 8, for example, is configured as an electrolyzer and allows for providing hydrogen gas, which can be stored in the hydrogenation reactor 2 in chemically bound form on the hydrogen carrier material. Other hydrogen sources are conceivable, as well. It is advantageous that the transport container 1 is connectable to different hydrogen sources.

Figure 2:
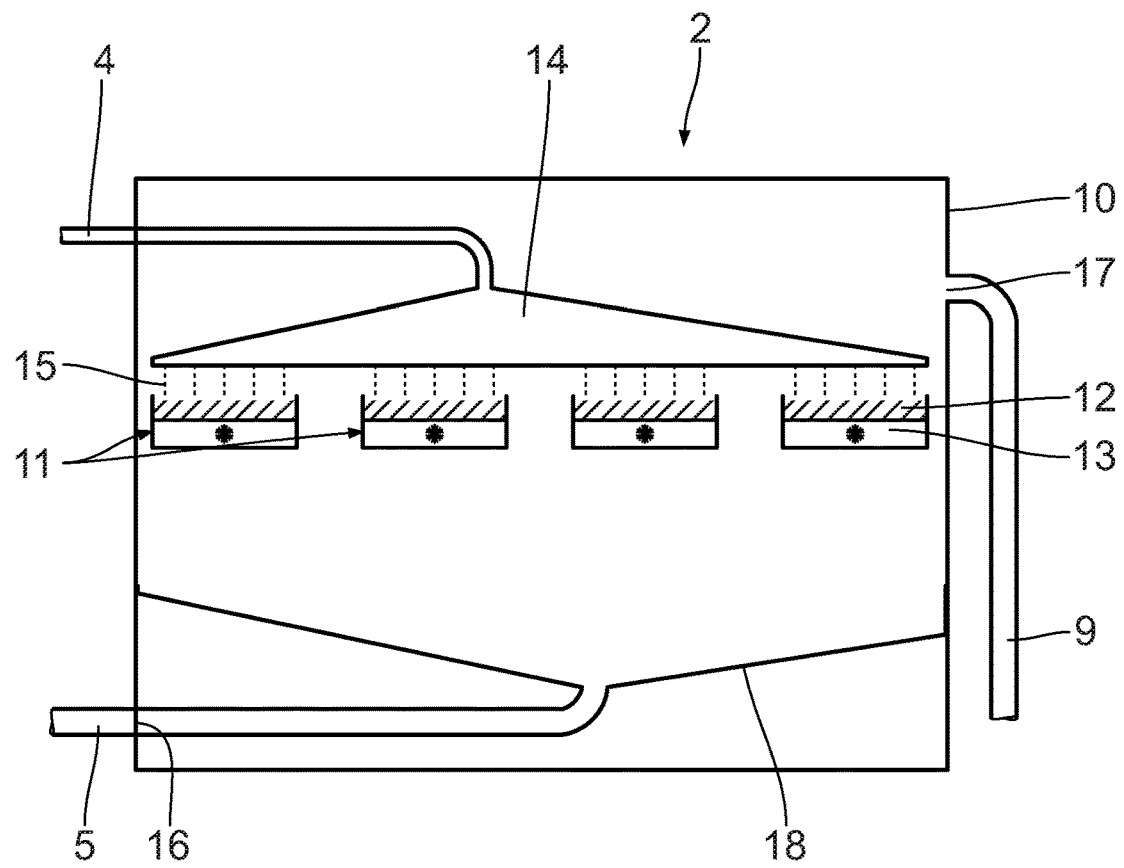
FIG. 2 is an enlarged schematic side view of the hydrogenation reactor in FIG. 1.

In the following, the hydrogenation reactor 2 will be described in more detail referring to FIG. 2. The hydrogenation reactor 2 has a reactor housing 10, in which a number of catalyst mounts 11 are arranged. On each catalyst mount 11, a catalyst carrier with catalyst material 12 is arranged. In the embodiment shown, the catalyst mounts 11 are lying, i.e. are arranged essentially horizontally.

It is conceivable to arrange the catalyst mounts 11 in an inclined manner relative to the horizontal and in particular perpendicularly. The catalyst mounts 11 with the catalyst material 12 configure a catalyst fixed bed. The hydrogenation reactor can be operated in a one-stage manner.

The catalyst mounts 11 may show tubes and/or plates and in particular be built of tubes and/or plates. The catalyst mount 11 is at least partially filled with catalyst material 12. However, the catalyst mount 11 may also be entirely filled with catalyst material 12. Glass balls, metal balls or metallic structures such as tubes, nets or grids, which are arranged on the inside and/or on an outer side of the catalyst mount 11 and attached thereto, may serve as catalyst carrier material.

On the catalyst mounts 11, a cooling unit 13, respectively, is provided to allow for a direct an efficient cooling of the catalyst material 12. By this means, it is ensured that the heat produced during the hydrogenation is reliably discharged from the catalyst material 12 and/or the catalyst mount 11.

The cooling unit 13, in particular, is integrated into the catalyst mount 11. The cooling unit 13, in particular, is configured as a sleeve filled with liquid, vapor and/or gas.

In the reactor housing 10, a distribution unit 14 is connected with the LOHC supply line 4. The distribution unit 14 is essentially configured in the form of a shower head and allows for a distributed supply of the at least partially dehydrogenated LOHC 15 to the catalyst material 12 on the catalyst mounts 11.

The distribution unit 14 may, in particular, show capillaries, flow breakers and/or distribution trays in order to ensure a reliable, homogeneous distribution of the LOHC educt to the catalyst mounts 11.

The hydrogenation reactor 2 has an LOHC outlet opening 16. By means of a collection facility 18, at least partially hydrogenated LOHC 15 is discharged from the hydrogenation reactor 2 via the LOHC outlet opening 16 and the LOHC output line 5. The collection facility 18 may be a bell-mouthed collection tank with an output line. Other embodiments of the collection facility 18 are conceivable, as well.

The hydrogenation reactor 2 has a hydrogen gas supply opening 17, via which hydrogen gas is supplied from the hydrogen source 8 via the hydrogen line 9 to the hydrogenation reactor 2. It is advantageous if the hydrogen gas supply opening 17 is arranged adjacent to the catalyst mounts 11 on the reactor housing 10.

In particular, inside the reactor housing 10, a compensating unit, which is not shown, may be provided in order to supply the hydrogen gas specifically to the catalyst mounts 11. The compensating unit is, in particular, arranged between the catalyst mounts 11 and/or around the catalyst mounts 11 in order to allow for a reliable supply of the hydrogen gas to the filling of the catalyst material. In particular, this allows for a uniform supply of the gas. The hydrogen gas supply opening 17 is arranged along the vertical direction above the catalyst mounts 11.

Due to the low density of the hydrogen gas, which causes an automatic rise of the hydrogen gas within the reactor housing 10, the hydrogen gas supply opening 17 may be arranged along a vertical direction below the catalyst mounts 11. In this case, the catalyst material 12 is contacted from above with LOHC 15 and from below with hydrogen gas. Other contacting procedure are possible, as well.

In the following, the function of the hydrogenation reactor according to a first method will be described in more detail. An educt flow with at least partially dehydrogenated LOHC 15 as hydrogen carrier material is supplied from the LOHC storage container 3 via the LOHC supply line 4 to the hydrogenation reactor. Before the supply, the LOHC educt is contacted with at least partially hydrogenated hydrogen carrier material, i.e. LOHC product, from the hydrogenation reactor 2, and thus pre-heated. At the same time, the at least partially hydrogenated hydrogen carrier material is cooled and, if needed, purified.

The LOHC supply line 4 and the LOHC outlet line 5 can be arranged together and/or adjacent to each other, at least section-wise, in order to allow for a direct or indirect contacting of LOHC educt and LOHC product, in particular in the counterflow process.

The hydrogenation of the at least partially uncharged hydrogen carrier material takes place, according to the embodiment shown, in the hydrogenation reactor 2 at a reaction pressure of about 45 bar and a reaction temperature of about 230° C. The hydrogen gas to be stored is conditioned by means of a conditioning unit, which is not shown, before the supply from the hydrogen source 8. The conditioned hydrogen gas is contacted with the LOHC 15 in the hydrogenation reactor 2 on the catalyst material 12 and thus chemically bound to the LOHC. The LOHC product is discharged from the hydrogenation reactor 2 via the LOHC output line 5, can be used for pre-heating the uncharged LOHC, as already mentioned above, and is subsequently stocked in the LOHC storage container 3. Beforehand, a cooling and conditioning of the at least partially hydrogenated hydrogen carrier material takes place.

Figure 3:
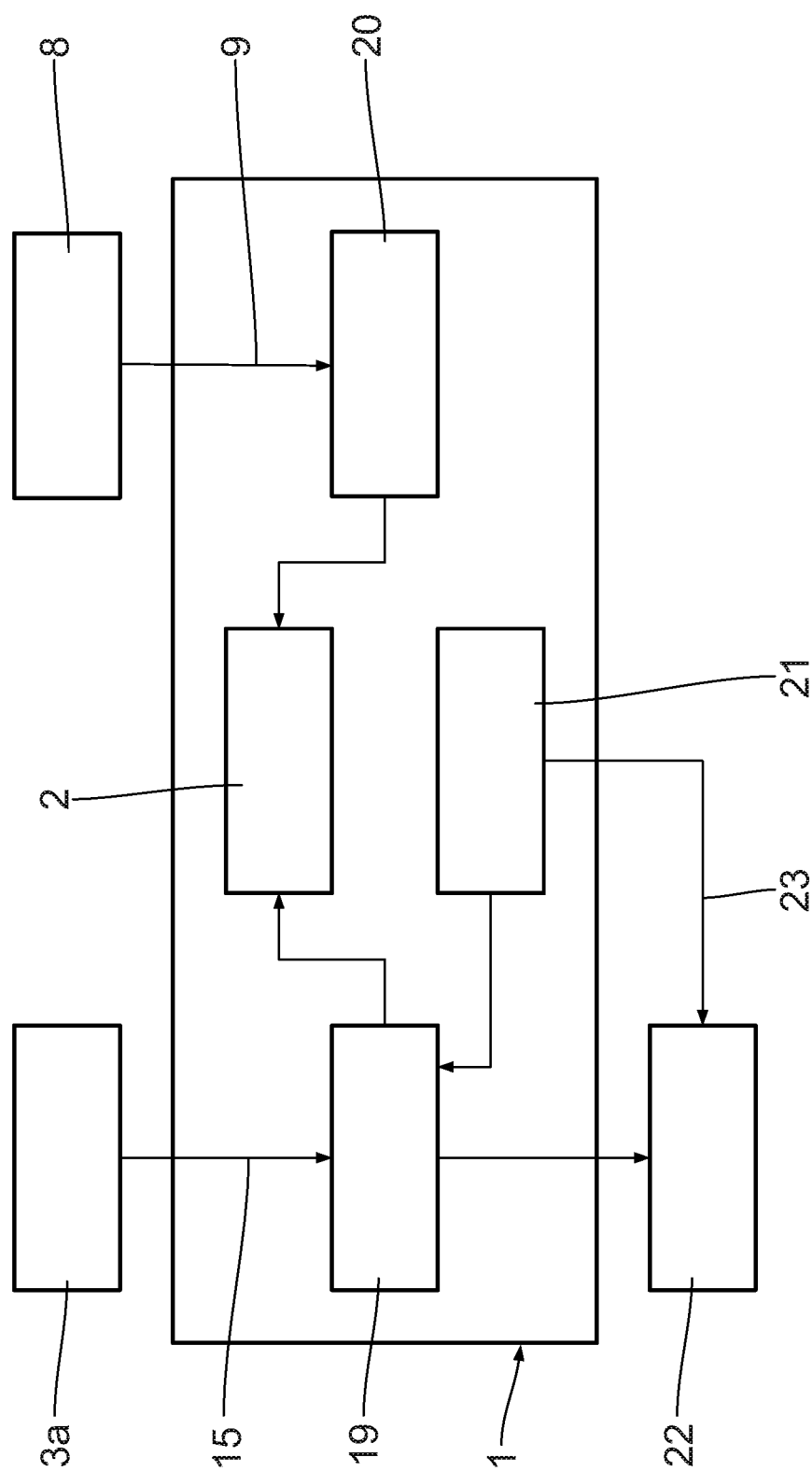
FIG. 3 is a schematic side view, corresponding to FIG. 1, of a transport container with a hydrogenation reactor according to a second embodiment.

A second embodiment of the invention is described referring to FIG. 3. Constructively identical parts obtain the same reference numbers as with the first embodiment, whose description is herewith referred to. Constructively different, but functionally similar parts obtain the same reference numbers with a postpositioned a.

First of all, from an LOHC storage container 3a, partially uncharged LOHC 15 is conveyed into the transport container 1. The LOHC storage container 3a may also be arranged inside the transport container 1.

In a heat recuperation unit 19, the LOHC 15 is pre-heated. Hydrogen from a hydrogen source 8 is conveyed into the transport container 1 via a hydrogen line 9. In a pre-conditioning unit 20, the pre-conditioning of the hydrogen takes place, for example by drying or filtering of solid parts and/or pre-heating.

In the hydrogenation reactor 2, pre-heated LOHC 15 and conditioned hydrogen are contacted. The at least partially charged LOHC 23 from the hydrogenation reactor 2 is processed in a post-conditioning unit 21, in particular, for example, by degassing, with the result that subsequently, the simple handling of the LOHC 23 is ensured. If needed, the LOHC product is entirely or partially used before or after the post-conditioning in order to pre-heat the LOHC educt in the heat recuperation unit 19, which may take place by direct or indirect contacting. Entirely conditioned and charged LOHC 23 is transferred to a second storage container 22 arranged outside the transport container 1.

The conditioning of the LOHC 23 after the hydrogenation reactor 2, in particular, is carried out such that in the second LOHC storage container 22, a dangerless stocking is possible. A creation of an explosive atmosphere through residual hydrogen is avoided.

While specific embodiments of the invention have been shown and described in detail to illustrate the application of the principles of the invention, it will be understood that the invention may be embodied otherwise without departing from such principles.

The invention claimed is:

1. A method for storing hydrogen gas, the method comprising the process steps:
   pre-heating an at least partially dehydrogenated hydrogen carrier material;
   storing hydrogen gas in chemically bound form on the at least partially dehydrogenated hydrogen carrier material and thus hydrogenating the at least partially dehydrogenated hydrogen carrier material into at least partially hydrogenated hydrogen carrier material; and
   cooling and conditioning the at least partially hydrogenated hydrogen carrier material, wherein pre-heating of the at least partially dehydrogenated hydrogen carrier material comprises a contacting with the at least partially hydrogenated hydrogen carrier material.

2. The method according to claim 1, wherein storing the hydrogen gas takes place at a process pressure between 30 bar and 60 bar.

3. The method according to claim 1, further comprising conditioning the hydrogen gas, wherein conditioning the hydrogen gas comprises at least one of pre-heating the hydrogen gas and separating at least one impurity.

4. The method according to claim 3, wherein separating the at least one impurity comprises at least one separation stage.

5. The method according to claim 3, wherein separating the at least one impurity shows at least one of a catalytic conversion and an adsorptive drying.

6. The method according to claim 3, wherein separating the at least one impurity comprises desulfurization.

7. The method according to claim 3, wherein conditioning the hydrogen gas takes place until an adjustable degree of purity of the hydrogen gas is achieved.

8. The method according to claim 3, wherein the at least one impurity is present in at least one a solid aggregate state and a gaseous aggregate state.

9. The method according to claim 3, wherein the separation comprises several separation stages.

10. The method according to claim 3, wherein the at least one separation stage serves for separating an impurity of a specific aggregate state.

11. The method according to claim 1, wherein cooling the at least partially hydrogenated hydrogen carrier material takes place by an additional cooling unit.

12. The method according to claim 1, wherein conditioning the at least partially hydrogenated hydrogen carrier material comprises a removal of physically dissolved hydrogen gas in the at least partially hydrogenated hydrogen carrier material.

13. The method according to claim 1, wherein storing the hydrogen gas takes place at a process temperature between 200° C. and 350° C.

\* \* \* \* \*